United States Patent

[11] 3,618,122

| [72] | Inventor | Anthony Maschak |
| | | 40 Torre Place, Yonkers, N.Y. 10703 |
| [21] | Appl. No. | 50,080 |
| [22] | Filed | June 26, 1970 |
| [45] | Patented | Nov. 2, 1971 |

[54] TIDE INDICATING AND RECORDING DEVICE
10 Claims, 6 Drawing Figs.

[52] U.S. Cl. .................................................. 346/72,
 73/312, 346/111
[51] Int. Cl. ............................................. G01f 23/08,
 G01d 9/26
[50] Field of Search ....................................... 346/72,
 111; 73/312, 305, 170 A, 321

[56] References Cited
UNITED STATES PATENTS
1,008,446 11/1911 Butts ........................... 346/111 X
1,494,561 5/1924 Nielsen ........................ 73/312

*Primary Examiner*—Joseph W. Hartary
*Attorney*—Cushman, Darby & Cushman

ABSTRACT: A device for indicating and/or recording the rise and fall of liquids, such as tides, comprises a backing member made of ferromagnetic material and disposed in a vertical plane with a magnetic marker movably held against the backing member by magnetic forces. The marker is operatively connected through a marker carrier to an actuating system including pulleys, weight means and float means with the float means being disposed so as to rise and fall with changing water levels to raise and lower the marker carrier. The marker carrier is provided with an undulating generally horizontally extending path receiving the marker and designed to impart horizontal and vertical movement components to the marker in step-by-step fashion with each changing tide, whereby such movements may be translated into a graph or chart on recording paper providing a visual indication and record.

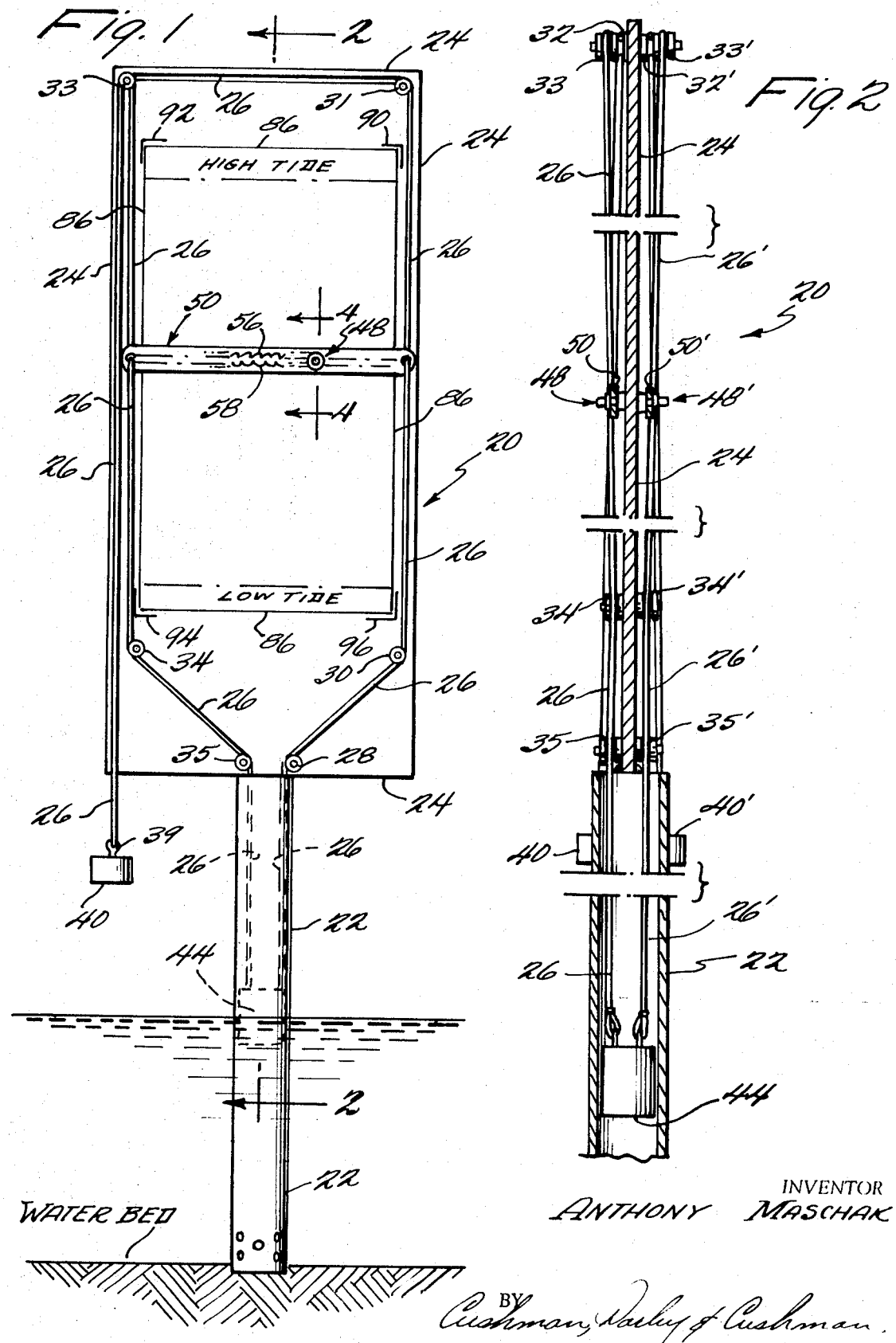

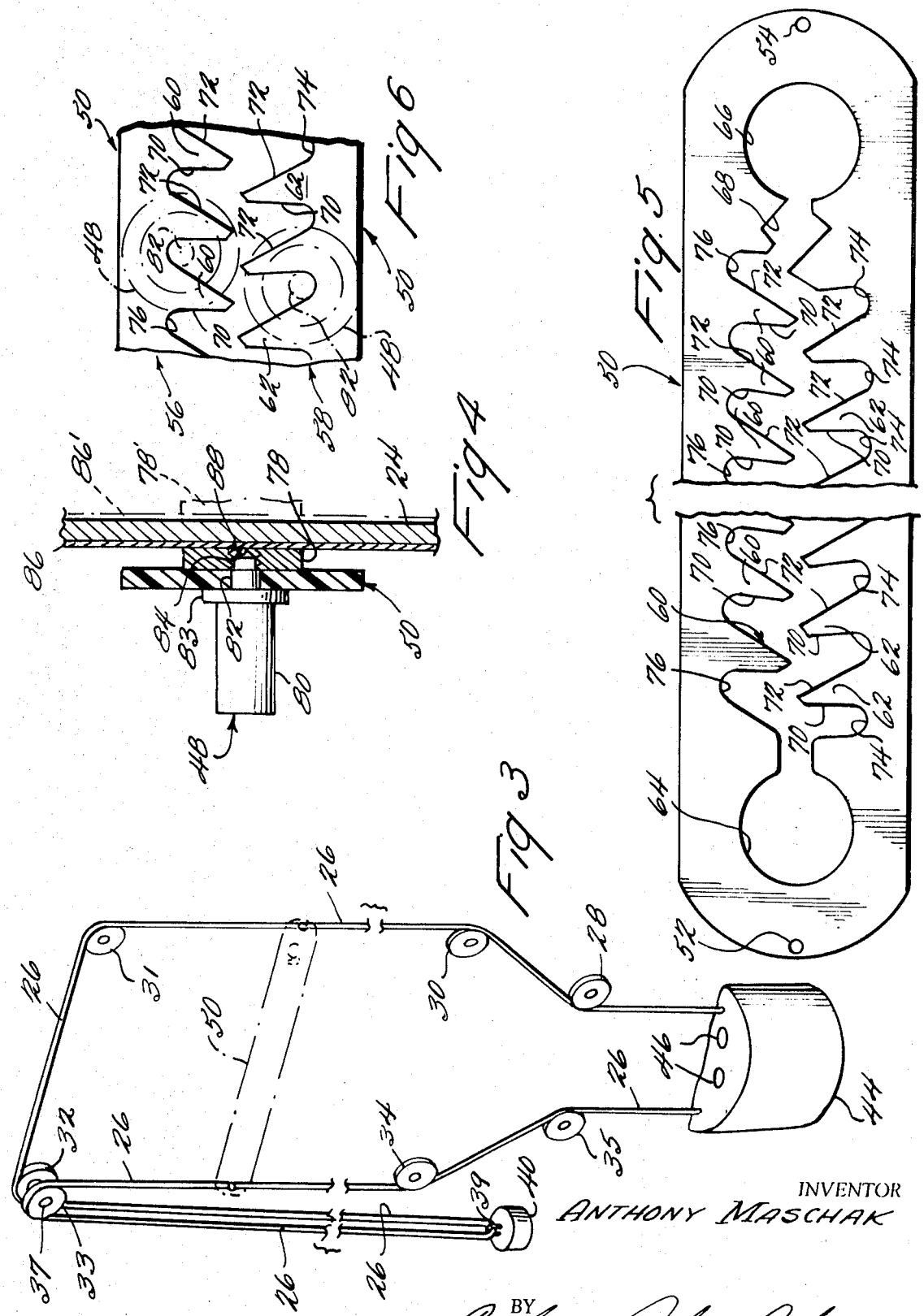

TIDE INDICATING AND RECORDING DEVICE

This invention relates to devices for indicating and/or recording the rise and fall of liquids, such as, for example, tide gauges or tide indicating and recording devices.

It is an objective of the invention to provide novel and improved structures of the character referred to. More particularly, it is an objective of the invention to design a tide gauge adapted to provide a visual indication of the tide condition at any particular time and also to provide a permanent record of changes in the tide over predetermined periods of time.

Additional objects of the present invention include the provision of tide indicating and recording devices, of the type under consideration, of novel and simplified design adapted to be readily constructed and disposed in operative position, and further designed to facilitate installation and replacement of the recording paper or chart.

A further object is to provide a novel device, of the character described, which will simultaneously record the tide condition and history over predetermined periods of time, on two opposite faces of a backing member whereby readings can be taken, either from the shore or from on boats, as will be evident.

According to the illustrative embodiment of the invention, to be described in more detail hereinbelow, the tide indicating and recording device comprises a marker movably engaged to a backing member with a recording paper or chart disposed therebetween. The backing member and marker are designed to be removably held together under magnetic attraction, as by providing a magnet in the marker construction and making the backing member of sheet steel or suitable ferromagnetic material. A system including a float, weights, and string or cable, is operatively connected to the marker with the float disposed on the surface of the water whereby as the tide changes the marker will be raised or lowered with the changing tide level. A marker carrier is arranged for vertical movement relative to the backing member, in response to changing tides, and it is so designed that the marker will not only have a vertical movement component but also will be given horizontal movement components, in one direction, somewhat in step-by-step fashion, across the recording paper, in response to variations in the tide.

The foregoing and other objects and advantages of the invention will appear from the following description of the embodiment illustrated in the accompanying drawings, wherein:

FIG. 1 is a front elevational view of a tide indicating and recording device embodying the invention;

FIG. 2 is an enlarged and fragmentary vertical sectional view taken along line 2—2 of FIG. 1, and partially broken away for illustrative purposes;

FIG. 3 is a perspective view of the system of pulleys, cord, weights and float shown in FIG. 1 and partially broken away for illustrative purposes;

FIG. 4 is an enlarged and fragmentary vertical sectional view taken along line 4—4 of FIG. 1;

FIG. 5 is an enlarged elevational view of a marker carrier design embodying the invention, and partially broken away; and FIG. 6 is an enlarged and fragmentary elevational view of a part of the marker carrier with the marker shown in phantom lines in two different slots or notches in the carrier to indicate how the design of the carrier will effect both horizontal and vertical movement components as the marker is actuated by successive tides.

Referring now to the drawings, wherein like or corresponding reference numerals have been used throughout the various figures to indicate like or corresponding parts of the illustrative embodiment of the invention, FIG. 1 shows the tide indicating and recording device 20 as including tube 22 adapted to be at least partially immersed in the water, whose tide is to be recorded. The tube 22 is shown as extending down to the water bed and is apertured at its bottom for ingress and outflow of water. A backing member 24 of rectangular shape is shown disposed above the tube 22. This backing member, in an exemplary embodiment thereof, is made of a ferromagnetic metal, such as sheet steel. It may be welded or otherwise suitably fixedly secured to the tube 22 in the position thereof shown in FIGS. 1 and 2. A string or cord 26 is shown as being trained around pulleys or rollers 28, 30, 31, 32, 33, 34, and 35, as best seen in FIG. 3. Pulleys 32 and 33 are mounted on the same shaft 37, as shown. String 26 is shown extending through a ring 39 on weight 40 and the ends of the string are fixed to a float 44 slidably disposed in the tube 22. The pulleys and rollers are suitably attached to the backing member 24 in the relative positions thereof indicated.

Float 44 is shown as carrying suitable weights 46 (see FIG. 3), and it will rise and fall in conjunction with the changing tides, as will be evident. Thus, as the tide comes in, or goes out, the float 44 will rise or fall in tube 22, weight 40 will descend or ascend, as will be evident, and the length of string 26 between pulleys 30, 31 and between pulleys 34, 33 will move in an upward or downward direction, as the case may be. This movement of the string 26 is utilized to effect corresponding vertical movement of a marker 48 and marker carrier 50.

The marker carrier 50 is suitably fixedly connected at its ends to the two sections of string 26, between pulleys 30, 31 and 34, 33. Apertures 52, 54 are shown in FIGS. 1 and 5 as being provided in the ends of the marker carrier 50 for insertion therethrough of the string 26. The carrier will be fixedly attached to the string, as by knots in string 26 or by using a suitable adhesive material, or the like, as will be evident.

The carrier 50 may be made of any appropriate material. In an exemplary embodiment, it is intended that it be made of a clear plastic, and a plurality of teeth are shown as formed in the carrier defining an upper 56 and a lower 58 row of teeth 60, 62 respectively, of a particular and related configuration to effect the desired movements of marker 48 in response to changing tides, as will become apparent. Holes 64, 66 are provided at each end of the rows of teeth 60, 62, as best seen in FIG. 5. These holes are designed for the insertion and removal of the marker, as will be more fully described hereinbelow. A trap 68 is shown intermediate hole 66 and the last pair of teeth 60, 62.

It will be seen that the teeth 60, 62 are alternating or staggered to define an undulating path comprising alternating peaks and valleys, between holes 64, 66. The teeth, furthermore, each include a vertical side 70 and an inclined side 72.

The marker 48 will be initially inserted in the hole 64 at the left in FIG. 5 in the initial set up. It will then be manually moved so as to be disposed in the first slot or notch 74 in the lower 58 series of teeth 62. Thereafter, successive changes in tide will effect a corresponding rising and falling of the marker 48 relative to the stationary backing member 24 while at the same time the marker 48 will be moved in stepwise fashion from the left to the right across the backing member, from each lower slot 74 to the next adjacent upper slot 76, and on through the undulating path defined by the upper and lower rows of teeth 60, 62, as will be evident.

The marker 48 is shown in FIG. 4 as including a magnet 78, an ink reservoir 80 and an intermediate shaft section 82, and collar 83 all suitably connected together to constitute a unitary structure for operational purposes. The magnet 78 is shown as threadedly receiving a threaded stud 84 carried by the shaft 82. As best seen in FIG. 4, a sheet of suitable recording paper 86 is arranged on the backing member 84, and the marker 48 is provided with a suitable marking elements such as a felt tip or metal pen point designed to make a permanent trace or graph on the recording paper 86 as the marker 48 is moved in response to tide changes. The tip or pen point may be provided at the tip 88 of the threaded stud 84, as shown in FIG. 4.

The recording paper 86 may be of any desired size and shape, for example, it is shown in FIG. 1 as being of generally rectangular configuration. It may be suitably conveniently secured to the backing member 24, as by Scotch tape or any convenient adhesive material or tape whereby installation and replacement of such paper will be facilitated. The paper may be of a standard type, designed for use with the present invention whereby a mounting arrangement may be delineated on the backing member 24 (see the outlined corners 90, 92, 94 and 96) and the paper may be provided with preformed lines thereon indicating the normally low tide and normally high tide for that particular installation, as illustrated in FIG. 1.

FIG. 2 illustrates an arrangement of a similar or identical structure on the other side of the backing member 24, with corresponding parts arranged in the same or similar manner to the corresponding structure on the other side of the backing member so that the tide gauge will record on both the front and back of the backing member 24, thus giving one indication on one side for readings taken, for example, on-shore, and another and identical indication for readings taken, for example, on boats.

The corresponding pulleys (28 and 28', 30 and 30', 31 and 31', 32 and 32', 33 and 33', 34 and 34', and 35 and 35'), are indicated in FIG. 2 as being coaxially mounted on shafts carried by backing member 24. The marker carrier 50' will be designed so that the marker 48' will move from left to right across the paper, as viewed from the right in FIG. 2.

Thus, it will be evident that parts on the right side of the backing member 24, as viewed in FIG. 2, have been given primed reference numerals corresponding to the unprimed numerals used for corresponding parts on the left side of the backing member.

It will be understood that only one side of the backing member may be provided with this indicating and recording device of the invention, if desired.

The device 20 may be mounted on docks and shore lines, for example by attaching the tube 22 to suitable dock structure, as will be evident.

The exemplary marker carrier shown in FIG. 5 is designed to have 33 teeth 60, 62 therein to record 33 tides, that is, it will provide a record for the tides over an 8 day period, as will be appreciated. At the end of the 33 tides, the marker 48 will become trapped in the trap 68. Thereafter, it will be removed from the right side of carrier 50 through the hole 66, and then reattached at the left side of the carrier through the hole 64 to start the next 8 day recording period. The previous recording paper will be removed and a new sheet of paper installed, as will be evident.

It will be appreciated that the design of the pulleys or rollers can be varied, as desired, and suitable adjustment or modification can be made in the size, shape and other constructional details of the various parts, depending, for example, on how extreme the variation is between the high and low tides being recorded, the period of time for which a permanent record is desired, etc.

As best indicated in FIG. 6, the shaft section 82 (and 82') of marker 48 (and 48') will be moved into the bight of the slots 74, 76 (74', 76') successively and sequentially or serially, during vertical, up and down movements of the carrier 50 (and 50'). Thus, during each reversal in the tide, the inclined side 72 of the tooth oppositely facing the slot the section 82 is in, will drive the shaft section 82 along that inclined side and into the bight of its respective tooth slot, and so on, as the marker is moved up and down, and to the left through the undulating path defined between teeth 60, 62.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims:

WHAT IS CLAIMED IS

1. A tide recording and indicating device adapted to be arranged adjacent shore lines, said device comprising: a marker and a backing member adapted to carry thereon a sheet of paper or the like for recording purposes; means for movably mounting said marker to said backing member on one face thereof; means operatively connected to said marker for transmitting horizontal and vertical movement components to said marker relative to said backing member and in response to rising and falling tides.

2. The structure defined in claim 1 wherein said marker includes a magnet and said backing member is made of ferromagnetic material whereby the marker will be held in position on said backing member by magnetic attraction.

3. The structure defined in claim 1 wherein said means operatively connected to said marker includes a marker carrier arranged for vertical movements relative to said backing member and in response to changing tide levels, said carrier being formed with an upper and a lower layer of spaced teeth arranged in alternating or staggered relation to define a generally horizontal path of alternating peaks and valleys, said marker being adapted to be received in said path and said teeth having cooperating straight and inclined sides whereby said marker will undergo movement having horizontal and vertical components in response to vertical movements of said carrier.

4. The structure defined in claim 3 wherein said means operatively connected to said marker includes a float and a weight attached together through an elongated flexible member fixedly connected to said marker carrier, a plurality of pulleys arranged in spaced relation on said backing member, said elongated flexible member being trained around said pulleys, and said float being adapted to be disposed at the water level to rise and fall with the changing tides and thereby effect corresponding vertical movements of said marker carrier.

5. The structure defined in claim 4 wherein a tubular member depends from said backing member and is adapted to be disposed, at least partially, in the water whose tides are to be recorded, said float being slidably disposed in said tubular member for vertical movement therein.

6. The structure defined in claim 4 wherein said elongated flexible member includes two horizontally spaced and parallel vertical sections, said marker carrier being fixed to said sections for vertical movement therewith.

7. The structure defined in claim 6 wherein said flexible member is made of string.

8. The structure defined in claim 6 wherein said marker includes a magnet and said backing member is made of ferromagnetic material whereby the marker will be held in position on said backing member by magnetic attraction, said magnet being disposed between said marker carrier and said backing member, and said marker including a shaft portion adapted to be disposed in said path in said carrier.

9. The structure defined in claim 3 wherein said marker includes a magnet and said backing member is made of ferromagnetic material whereby the marker will be held in position on said backing member by magnetic attraction, said magnet being disposed between said marker carrier and said backing member, and said marker including a shaft portion adapted to be disposed in said path in said carrier.

10. The structure of claim 1 wherein a tide recording and indicating device as defined in claim 1 is arranged in like fashion on the other face of said backing member so that identical recordings may be taken simultaneously on both sides of said backing member.

* * * * *